US012685268B2

(12) United States Patent　　　　　　(10) Patent No.:　US 12,685,268 B2
Morrison et al.　　　　　　　　　　　　(45) Date of Patent:　　　Jul. 21, 2026

(54) COMBINE HARVESTERS HAVING REVERSIBLE RETURN SYSTEMS, AND RELATED METHODS

(71) Applicant: AGCO International GmbH, Neuhausen (CH)

(72) Inventors: Alastair Cameron Morrison, Randers (DK); Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 572 days.

(21) Appl. No.: 18/251,007

(22) PCT Filed: Oct. 20, 2021

(86) PCT No.: PCT/IB2021/059666
§ 371 (c)(1),
(2) Date: Apr. 28, 2023

(87) PCT Pub. No.: WO2022/090872
PCT Pub. Date: May 5, 2022

(65) Prior Publication Data
US 2024/0008413 A1　　Jan. 11, 2024

(30) Foreign Application Priority Data
Oct. 29, 2020　(GB) ..................................... 2017129

(51) Int. Cl.
*A01F 12/44*　　　　(2006.01)
*A01D 41/12*　　　　(2006.01)
(Continued)

(52) U.S. Cl.
CPC ............ *A01F 12/446* (2013.01); *A01D 41/12* (2013.01); *A01F 12/184* (2013.01);
(Continued)

(58) Field of Classification Search
CPC .... A01F 12/446; A01F 12/184; A01F 12/444; A01F 12/48; A01F 17/02; A01D 41/12; A01D 41/1276
See application file for complete search history.

(56) References Cited

U.S. PATENT DOCUMENTS 4,307,732 A * 12/1981 De Busscher ........ A01F 12/444
　　　　　　　　　　　　　　　　　　209/318
4,663,919 A * 5/1987 Stroh ................... A01D 41/142
　　　　　　　　　　　　　　　　　　56/11.2
(Continued)

FOREIGN PATENT DOCUMENTS

DE　　　3832996 A1　4/1989
GB　　　2024594 A * 1/1980 .............. A01F 7/06
WO　　2010116793 A1 10/2010

OTHER PUBLICATIONS

Translation of Document GB-2024594-A as retrieved on Oct. 27, 2025 (Year: 1980).*
(Continued)

*Primary Examiner* — Joseph M Rocca
*Assistant Examiner* — Jose Antonio Martinez

(57)　　　　　　　ABSTRACT
A combine harvester includes a feederhouse configured to convey a crop material from a harvesting header, a threshing system configured to receive the crop material from the feederhouse and separate straw therefrom, and a cleaning system below the threshing system and configured to separate grain from chaff of the crop material. The cleaning system includes a reversible return system configured to receive the crop material from the threshing system, a grain pan below the return system, at least one oscillating grate configured to receive the crop material from the grain pan, and a blower configured to direct air rearward and upward through the oscillating grate. The return system delivers the crop material to a forward end of the grain pan in a first (Continued)

operating mode, and to a rearward end of the grain pan in a second operating mode. Related methods are also disclosed.

14 Claims, 5 Drawing Sheets

(51) Int. Cl.
  *A01F 12/18*     (2006.01)
  *A01F 12/48*     (2006.01)
  *A01F 17/02*     (2006.01)
(52) U.S. Cl.
  CPC ............ *A01F 12/444* (2013.01); *A01F 12/48* (2013.01); *A01F 17/02* (2013.01)

(56)                References Cited

U.S. PATENT DOCUMENTS

| | | | | | |
|---|---|---|---|---|---|
| 4,968,285 | A | * | 11/1990 | Schuhmacher | ......... A01F 12/52 |
| | | | | | 460/97 |
| 2014/0045563 | A1 | * | 2/2014 | Cooksey | ................. A01F 12/46 |
| | | | | | 460/114 |
| 2014/0162737 | A1 | * | 6/2014 | Stan | ........................ A01F 12/44 |
| | | | | | 460/1 |

OTHER PUBLICATIONS

Uk Intellectual Property Office, Search report for related UK Application No. GB2017129.4, dated Apr. 16, 2021, 3 pages.

* cited by examiner

COMBINE HARVESTERS HAVING REVERSIBLE RETURN SYSTEMS, AND RELATED METHODS

FIELD

Embodiments of the present disclosure relate to combine harvesters. More particularly, embodiments of the present disclosure relate to apparatuses and methods for controlling crop material flow through a separation system.

BACKGROUND

Self-propelled combine harvesters are used by farmers to harvest a wide range of crops. Typically, a combine harvester cuts crop material, threshes grain therefrom, separates the threshed grain from the straw, and cleans the grain before storage in an onboard grain tank. Straw and crop residue is ejected from the rear of the combine harvester in the field.

Combine harvesters typically have one or more threshing cylinders that rotate on axes that are either parallel or transverse to a direction of travel of the combine harvesters and thresh the cut crop material. Grain and chaff separated in this process falls due to gravity through a concave grate onto an underlying grain pan, which is driven in an oscillating manner to convey the grain and chaff rearward to a rear edge, where the grain and chaff falls into a cleaning unit. The straw by-product is ejected from the rear of the combine.

The cleaning unit of most combines operates according to a well-established process in which grain and chaff (also referred to in the art as material other than grain (MOG)) cascading down from the grain pan is subjected to an airstream created by one or more fans. A chaffer (or upper sieve) has a frame that supports a series of louvers, which are positioned to allow grain to fall downward through the chaffer while allowing a flow of cleaning air to pass upward and rearward through the chaffer. The cleaning air flow tends to force MOG rearward and restricts MOG from falling through the chaffer. The heavier grain falls through the chaffer and optionally through another cleaning sieve below before being conveyed to the grain tank.

The speed of the airflow through the chaffer may be selected to balance various operational parameters for agronomic benefit, such as percentage of chaff removed from the crop material, percentage of grain lost from the rear of the machine, mass throughput, and fuel usage.

Cleaning units in combine harvesters are described in more detail in, for example, U.S. Pat. No. 9,426,943, "Combine Harvester Grain Cleaning Apparatus," issued Aug. 30, 2016; U.S. Patent Application Publication 2014/0128133, "Harvester Having Chaffer with Tiltable Section," published May 8, 2014; and U.S. Pat. No. 5,624,315, "Cleaning Means for an Agricultural Harvesting Machine," issued Apr. 29, 1997.

BRIEF SUMMARY

A combine harvester includes a feederhouse that conveys a crop material from a harvesting header, a threshing system that receives the crop material from the feederhouse and separates straw therefrom, and a cleaning system below the threshing system that separates grain from chaff of the crop material. The cleaning system includes a reversible return system that receives the crop material from the threshing system, a grain pan below the return system, at least one oscillating sieve to receive the crop material from the grain pan, and a blower to direct air rearward and upward through the oscillating sieve. The return system delivers the crop material to a forward end of the grain pan in a first operating mode, and to a rearward end of the grain pan in a second operating mode.

A method of operating a combine harvester includes cutting a first crop in a first agricultural field, threshing the first crop in the threshing system, transferring the threshed first crop to the reversible return system, translating the threshed first crop with the return system forward relative to a direction of travel of the combine harvester to the grain pan, and stratifying and transferring the threshed first crop rearward on the grain pan to a chaffer. An operating mode of the reversible return system can be changed to harvest a second crop. The second harvest includes cutting the second crop in a second agricultural field, threshing the second crop in the threshing system, transferring the threshed second crop to the reversible return system, translating the threshed second crop with the return system rearward relative to the direction of travel of the combine harvester, and transferring the threshed second crop to the chaffer.

In some embodiments, a method of operating a combine harvester includes cutting corn with a harvesting header, threshing the corn in a threshing system, transferring the threshed corn to a reversible return system, translating the threshed corn with the return system rearward relative to a direction of travel of the combine harvester to a rear of a grain pan, and transferring the threshed corn to a chaffer.

BRIEF DESCRIPTION OF THE DRAWINGS

While the specification concludes with claims particularly pointing out and distinctly claiming what are regarded as embodiments of the present disclosure, various features and advantages of the disclosure may be more readily ascertained from the following description of example embodiments when read in conjunction with the accompanying drawings, in which:

DETAILED DESCRIPTION

Figure 1:
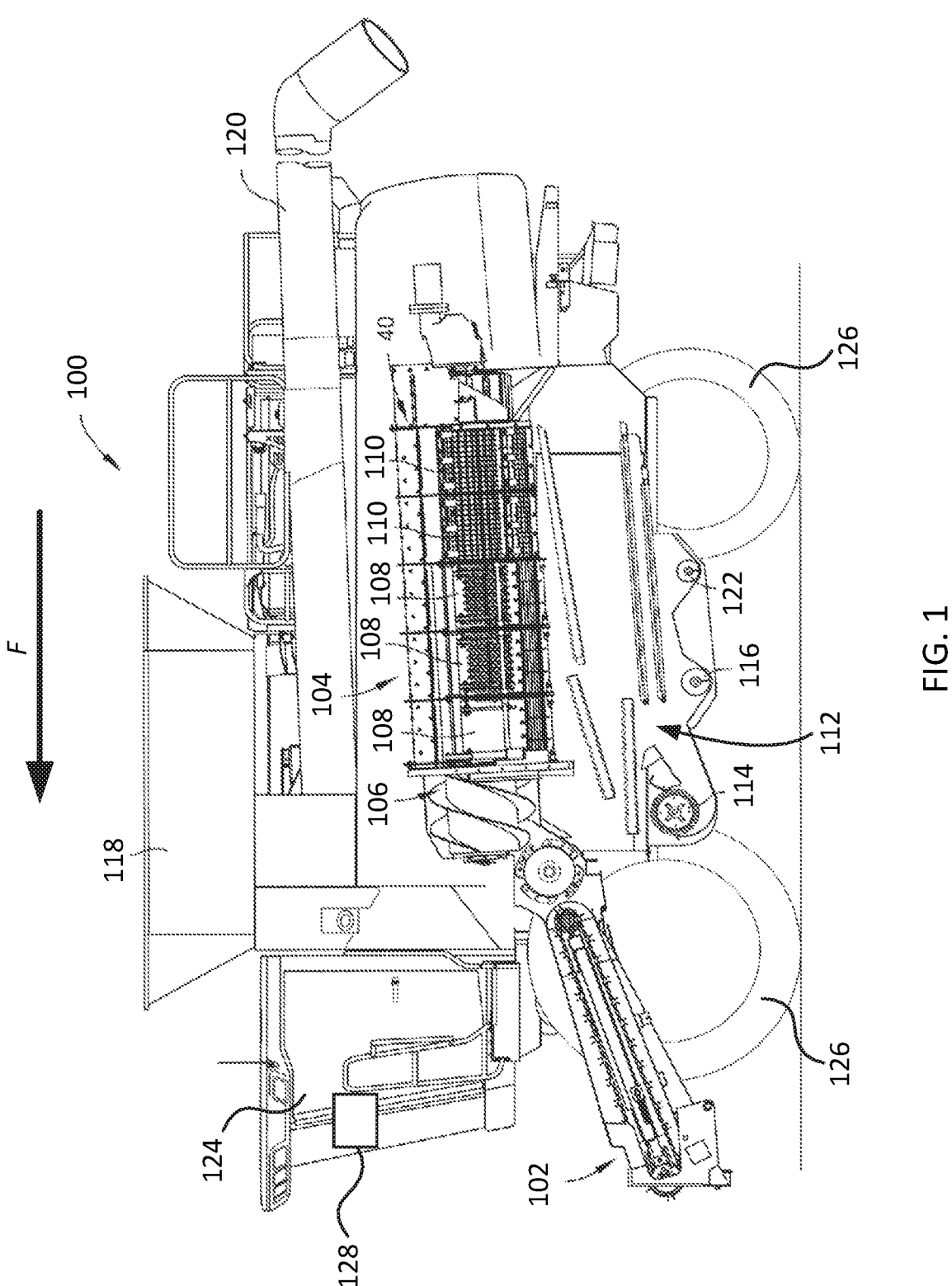
FIG. 1 is a simplified side view of a combine harvester.

The illustrations presented herein are not actual views of any combine harvester or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

From reading the following description it should be understood that the terms "longitudinal" and "transverse" are made in relation to the combine harvester's normal direction of travel. In other words, the term "longitudinal" equates to the fore-and-aft direction, whereas the term "transverse" equates to the crosswise direction, or left and right. Furthermore, the terms "axial" and "radial" are made in relation to a rotating body such as a shaft, wherein axial relates to a direction along the rotation axis and radial equates to a direction perpendicular to the rotation axis.

With reference to FIG. 1, a self-propelled combine harvester 100 is configured to carry a harvesting header that cuts and gathers a strip of crop as the combine harvester 100 is driven across a crop field in a forward direction F. A feederhouse 102 conveys the cut crop material from the harvesting header into a threshing system 104 in the combine harvester 100, in which the crop material is threshed and separated. The threshing system 104 may include, for example, an axial flow processing rotor 106 as described in U.S. Pat. No. 10,051,790, "Vane Arrangement in Combine Harvester Processor," issued Aug. 21, 2018; a transverse flow rotor as described in U.S. Pat. No. 9,345,197, "Combine Harvester with Even Crop Distribution," issued May 24, 2016; a hybrid system; or any other selected design.

The axial flow rotor 106 may generally move crop materials axially and helically rearward, threshing and separating grain from MOG. Concave assemblies 108 and separator grate assemblies 110 enable the grain to escape laterally and/or downward into a cleaning system 112 below. Bulkier stalk and leaf materials are retained by the concave assemblies 108 and the grate assemblies 110 and are impelled out the rear of the threshing system 104 and ultimately out the rear of the combine harvester 100.

The cleaning system 112 includes a blower 114 that can provide a stream of air through the cleaning system 112, which is directed out the rear of the combine harvester 100 to carry lighter chaff particles away from the grain as the grain migrates downward toward the bottom of the cleaning system 112 to a grain auger 116. The auger 116 delivers the clean grain to an elevator that carries the grain to a storage bin 118 on top of the machine, from which it is ultimately unloaded via an extendible unloading spout 120 (shown in a stowed position). A returns auger 122 at the bottom of the cleaning system 112 may be used to recirculate partially threshed crop material into the front of the threshing system 104 for an additional pass through the threshing system 104.

The combine harvester 100 also typically includes an operator cab 124, an engine, and wheels 126 and/or tracks. In some embodiments, the combine harvester 100 may include a controller 128 (represented in FIG. 1 simply as a rectangular box), typically located in the operator cab 106, which the operator may use to control the combine harvester 100.

Figure 2:
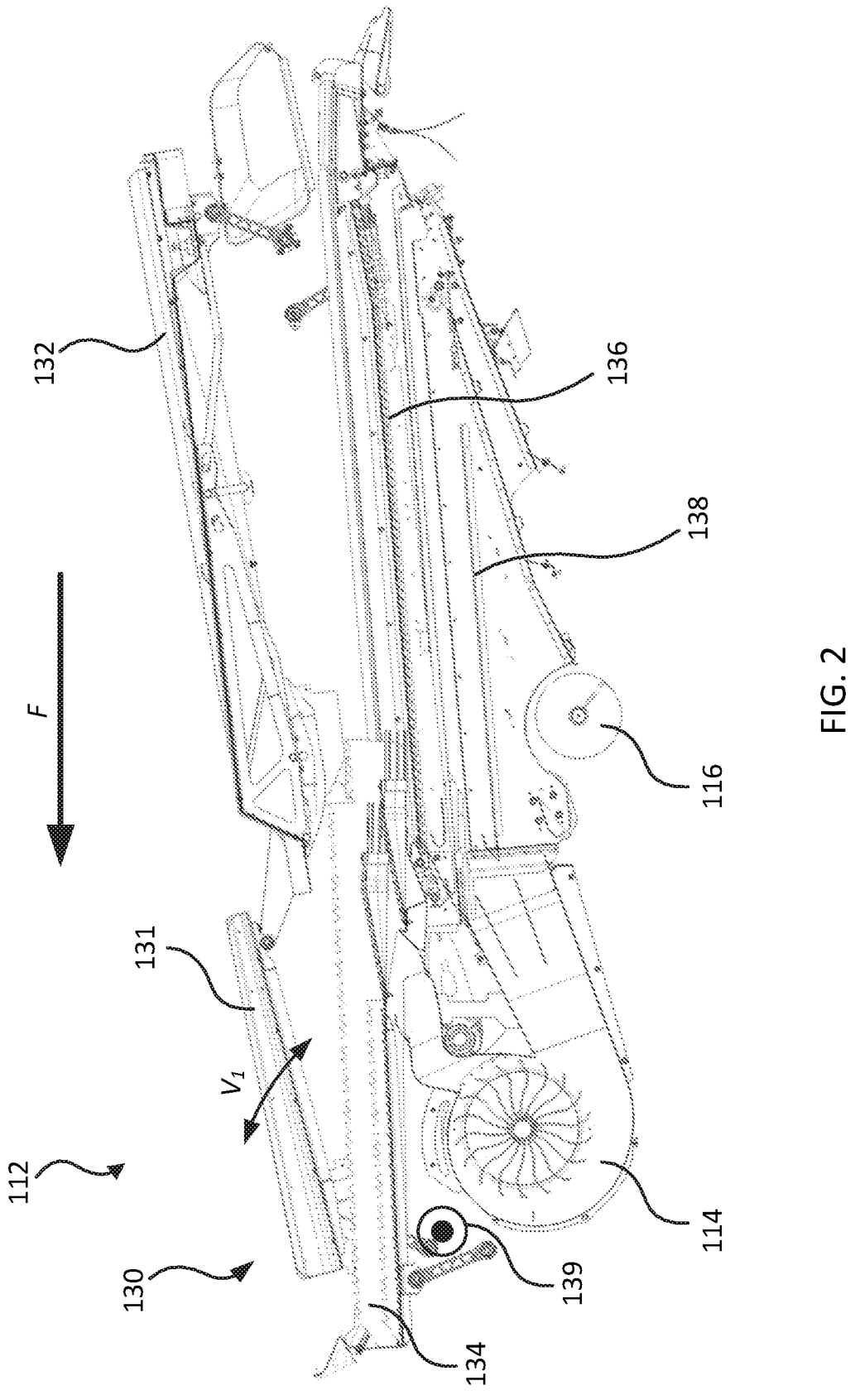
FIG. 2 is a simplified side view of a crop processing apparatus having a reversible return system that may be used in the combine harvester of FIG. 1.

The cleaning system 112 is shown in more detail in FIG. 2. Crop material falls from the threshing system 104 onto a reversible return system 130 or a rear pan 132, depending on the position in the threshing system 104 from which the crop material falls. The return system 130 may include, for example, a vibrating return pan 131, a conveyor belt 133 (see FIG. 4), an auger (see FIGS. 5 and 6), or another conveyance device. The return system 130 may be operable to deliver the crop material to a forward end of a grain pan 134 located below the return system 130. In another configuration, and as depicted in FIG. 3, the return system 130 is operable to deliver the crop material to a rearward end of the grain pan 134.

The grain pan 134 conveys crop material rearward toward a chaffer 136 and a sieve 138. The grain pan 134 is coupled to a motor that shakes the grain pan 134 to help stratify and separate the crop material. That is, less-dense material tends to move toward the top of the crop material, and more-dense material tends to move toward the bottom of the crop material. Thus, when the crop material reaches the chaffer 136, some separation has already begun. Air from the blower 114 blows through the chaffer 136 and sieve 138 and helps the chaffer 136 and sieve 138 separate grain from MOG. The initial separation on the grain pan 134 may increase the ability of the chaffer 136 and sieve 138 to separate grain from MOG. The chaffer 136 and sieve 138 may operate as described in, for example, U.S. Pat. No. 9,426,943, "Combine Harvester Grain Cleaning Apparatus," issued Aug. 30, 2016; and U.S. Pat. No. 5,624,315, "Cleaning Means for an Agricultural Harvesting Machine," issued Apr. 29, 1997.

When harvesting certain crops, particularly corn, the amount of MOG leaving the threshing system 104 may be minimal, and thus, the chaffer 136 and sieve 138 may satisfactorily separate grain from MOG even without any initial separation by the grain pan 134. Thus, when harvesting such crops, the return system 130 may be switched to the configuration shown in FIG. 3 to bypass part or all of the grain pan 134. In this configuration, the speed of material flow may be prioritized over the amount of separation. Thus, a crop such as corn may be processed faster than in conventional combine harvesters.

Figure 3:
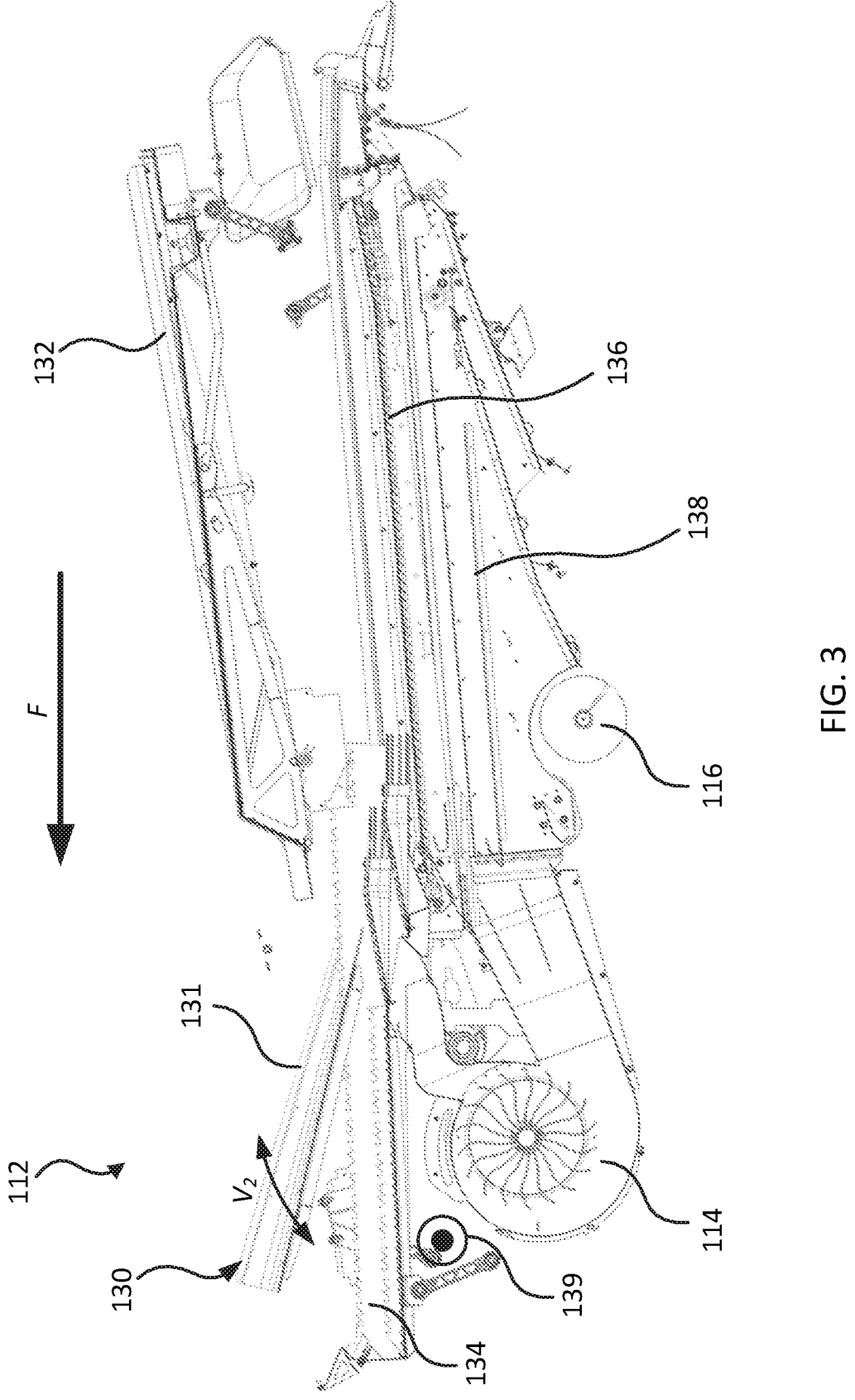
FIG. 3 is a simplified side view of the crop processing apparatus of FIG. 2 with the return system in a different configuration.

In embodiments in which the return system 130 includes a vibrating return pan 131, such as shown in FIGS. 2 and 3, the vibrating return pan 131 may have a major upper surface that can be sloped downward toward the forward end of the combine harvester 100 (FIG. 2) or sloped downward toward the rear end of the combine harvester 100 (FIG. 3). When sloped as shown in FIG. 2, the crop material tends to travel forward in the direction F. When sloped as shown in FIG. 3, the crop material tends to travel rearward, opposite the direction F. The vibrating return pan 131 may be coupled to a motor 139 that oscillates the vibrating return pan 131 to help move the crop material down-slope. The vibrating return pan 131 may shake or oscillate in the directions $V_1$ or $V_2$ as shown in FIG. 2 and FIG. 3, respectively. The direction $V_1$, speed, and amplitude of the oscillations may generally match the direction of oscillation of the rear pan 132. The direction $V_2$, speed, and amplitude of the oscillations may generally match the direction of oscillation of the grain pan 134. In some embodiments, the vibrating return pan 131 may be coupled to the grain pan 134 or the rear pan 132 such that the vibrating return pan 131 can be oscillated by a drive motor coupled to the grain pan 134 or the rear pan 132.

Figure 4:
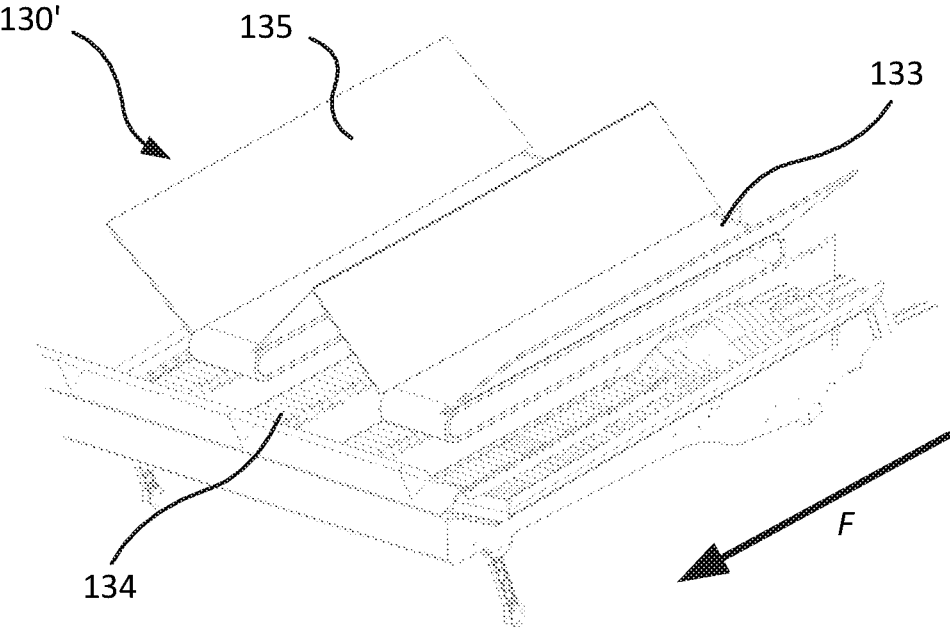
FIG. 4 is a simplified perspective view of another reversible return system.

FIG. 4 is a simplified perspective view showing a return system 130' that includes one or more reversible endless conveyor belts 133. The return system 130' may also include sloping panels 135 to direct material to the conveyor belts 133. Each conveyor belt 133 may be operable in two directions, such that upper surfaces of the belts 133 travel in the forward direction F or in the rearward direction, opposite the direction F. The direction of the conveyor belts 133 may be selected to deliver crop material to the front or rear of the grain pan 134, depending on the type of crop being harvested.

Figure 5:
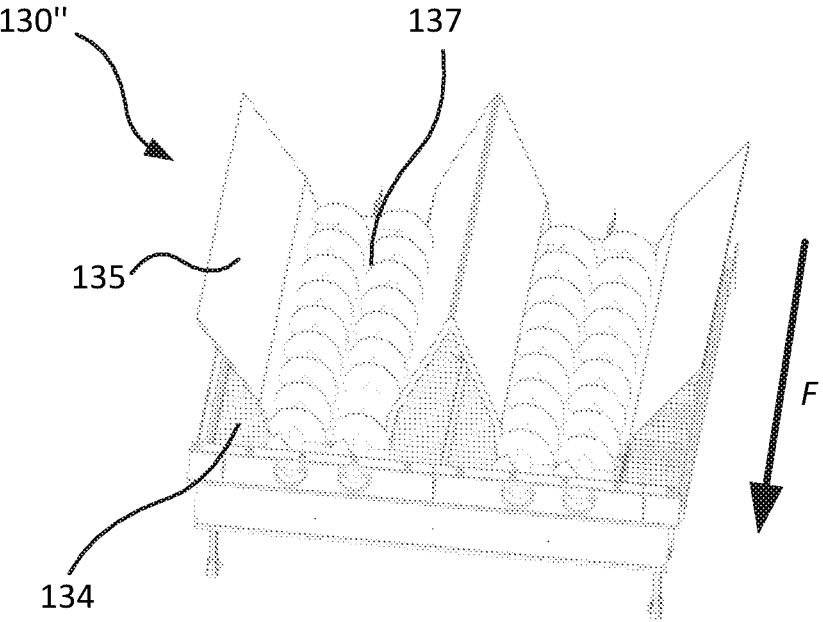
FIG. 5 is a simplified perspective view of another reversible return system.
Figure 6:
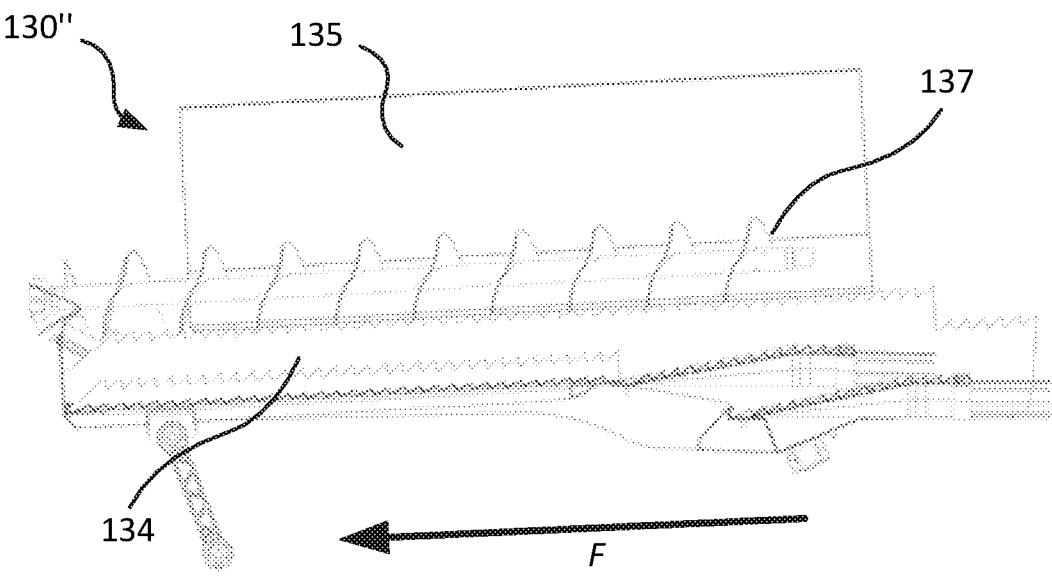
FIG. 6 is a simplified side cross-sectional view of the reversible return system of FIG. 5.

FIG. 5 is a simplified perspective view, and FIG. 6 is a side cross-sectional view, each showing a return system 130" that includes one or more reversible augers 137. The return system 130" may also include sloping panels 135 to direct material to the augers 137. Each auger 137 may be operable in two directions, such that augers 137 push material in the forward direction F or in the rearward direction, opposite the direction F. The direction of the augers 137 may be selected to deliver crop material to the front or rear of the grain pan 134, depending on the type of crop being harvested. Each of the return systems 130', 130" may be used in place of the return system 130 shown in FIGS. 2 and 3. Other mechanisms that can selectively deliver crop material to either the front of the grain pan 134 or the rear of the grain pan 134 may be devised.

Figure 7:
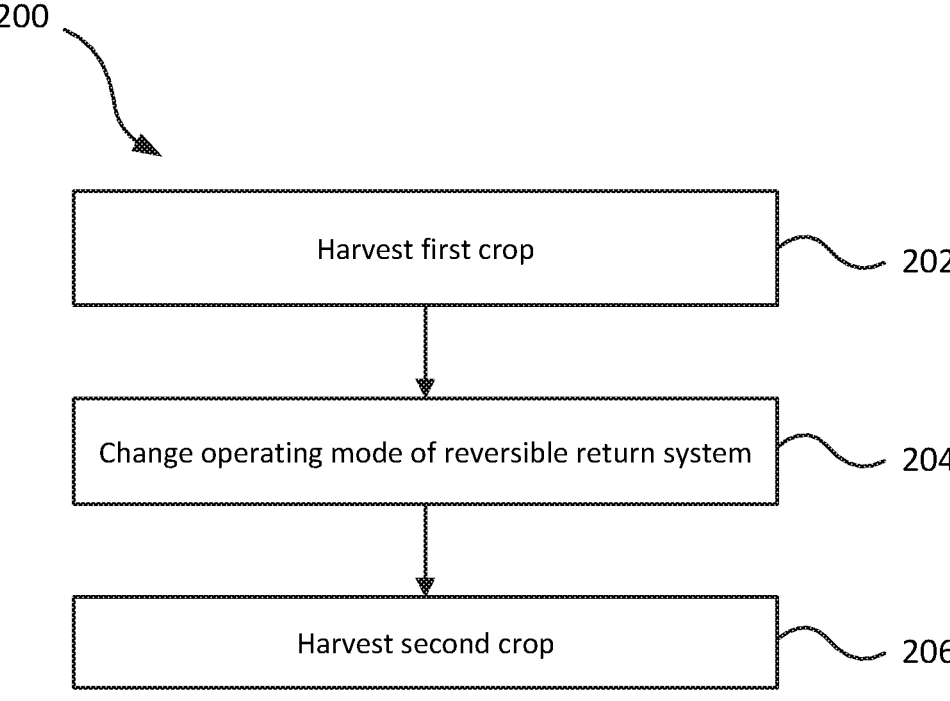
FIG. 7 is a simplified flow chart illustrating a method of using a combine harvester to harvest different crops in agricultural fields.

FIG. 7 is a simplified flow chart illustrating a method 200 of using the combine harvester 100 to harvest different crops in agricultural fields. In block 202, a first crop (e.g., wheat) is harvested, such as by cutting with a harvesting header, threshing in the threshing system 104, transferring crop to the reversible return system 130, translating the crop forward to the grain pan 134, stratifying and transferring the crop rearward to the chaffer 136, and separating grain from MOG on the chaffer 136 and sieve 138.

As indicated in block 204, an operating mode of the return system 130 can then be changed to harvest a second crop (e.g., corn), indicated by block 206. Harvesting the second crop is similar to harvesting the first crop, except that from the return system 130, crop material is transferred rearward. The crop material may land on the rear of the grain pan 134 or even on the chaffer 136, bypassing the grain pan 134.

Additional non-limiting example embodiments of the disclosure are described below.

Embodiment 1: A combine harvester comprising a feederhouse configured to convey a crop material from a harvesting header, a threshing system configured to receive the crop material from the feederhouse and separate straw therefrom, and a cleaning system below the threshing system and configured to separate grain from chaff of the crop material. The cleaning system includes a reversible return system configured to receive the crop material from the threshing system, a grain pan below the return system, at least one oscillating grate configured to receive the crop material from the grain pan, and a blower configured to direct air rearward and upward through the at least one oscillating grate. The return system is operable to deliver the crop material to a forward end of the grain pan in a first operating mode, and the return system is operable to deliver the crop material to a rearward end of the grain pan in a second operating mode.

Embodiment 2: The combine harvester of Embodiment 1, wherein the return system comprises a return pan configured to be tilted between a first orientation and a second orientation, wherein in the first orientation, a major upper surface of the return pan is sloped downward toward a forward end of the combine harvester, and wherein in the second orientation, the major upper surface of the return pan is sloped downward toward the forward end of the combine harvester.

Embodiment 3: The combine harvester of Embodiment 2, further comprising a motor configured to oscillate the return pan.

Embodiment 4: The combine harvester of Embodiment 2 or Embodiment 3, wherein in the first orientation, the return pan is coupled to a rear pan such that oscillation of the rear pan drives oscillation of the return pan.

Embodiment 5: The combine harvester of any one of Embodiment 2 through Embodiment 4, wherein in the second orientation, the return pan is coupled to the grain pan such that oscillation of the grain pan drives oscillation of the return pan.

Embodiment 6: The combine harvester of Embodiment 1, wherein the return system comprises at least one reversible endless conveyor belt.

Embodiment 7: The combine harvester of Embodiment 6, further comprising at least one sloping wall configured to direct the crop material from the threshing system to the at least one reversible endless conveyor belt.

Embodiment 8: The combine harvester of Embodiment 1, wherein the return system comprises at least one reversible auger.

Embodiment 9: The combine harvester of Embodiment 8, further comprising at least one sloping wall configured to direct the crop material from the threshing system to the at least one reversible auger.

Embodiment 10: The combine harvester of any one of Embodiment 1 through Embodiment 9, wherein the threshing system comprises at least one threshing rotor configured to thresh the crop material and separate straw therefrom, and at least one separator grate below the at least one threshing rotor.

Embodiment 11: The combine harvester of any one of Embodiment 1 through Embodiment 10, wherein the at least one oscillating grate comprises a chaffer and a sieve below the chaffer.

Embodiment 12: A method of operating a combine harvester having a reversible return system configured to receive crop material from a threshing system and deliver the crop material to a chaffer. The method comprises cutting a first crop in a first agricultural field, threshing the first crop in the threshing system, transferring the threshed first crop to the reversible return system, translating the threshed first crop with the return system forward relative to a direction of travel of the combine harvester to the grain pan, stratifying and transferring the threshed first crop rearward on the grain pan to a chaffer, changing an operating mode of the reversible return system, cutting a second crop in a second agricultural field, threshing the second crop in the threshing system, transferring the threshed second crop to the reversible return system, translating the threshed second crop with the return system rearward relative to the direction of travel of the combine harvester, and transferring the threshed second crop to the chaffer.

Embodiment 13: The method of Embodiment 12, wherein harvesting the second crop comprises harvesting corn.

Embodiment 14: The method of Embodiment 12 or Embodiment 13, wherein translating the threshed second crop rearward relative to the direction of travel of the combine harvester with the return system comprises transferring the threshed second crop to a rear of the grain pan.

Embodiment 15: The method of any of Embodiment 12 through Embodiment 14, wherein a mass flow rate of the second crop to the chaffer is higher than a mass flow rate of the first crop to the chaffer.

Embodiment 16: A method of operating a combine harvester, the method comprising cutting corn with a harvesting header, threshing the corn in a threshing system, transferring the threshed corn to a reversible return system, translating the threshed corn with the return system rearward relative to a direction of travel of the combine harvester to a rear of a grain pan, and transferring the threshed corn to a chaffer.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

The invention claimed is:

1. A combine harvester comprising:
a feederhouse configured to convey a crop material from a harvesting header;
a threshing system configured to receive the crop material from the feederhouse and separate straw therefrom;
a cleaning system below the threshing system and configured to separate grain from chaff of the crop material, the cleaning system comprising:
a reversible return system configured to receive the crop material from the threshing system;
a grain pan below the return system;
at least one oscillating sieve configured to receive the crop material from the grain pan; and
a blower configured to direct air rearward and upward through the at least one oscillating sieve;
wherein the return system comprises a return pan configured to be tilted between a first orientation and a second orientation, wherein in the first orientation, a major upper surface of the return pan is sloped downward toward a forward end of the combine harvester, and wherein in the second orientation, the major upper surface of the return pan is sloped downward toward a rear end of the combine harvester, wherein the return system is operable to deliver the crop material to a forward end of the grain pan in a first operating mode, and wherein the return system is operable to deliver the crop material to a rearward end of the grain pan in a second operating mode.

2. The combine harvester of claim 1, further comprising a motor configured to oscillate the return pan.

3. The combine harvester of claim 1, wherein in the first orientation, the return pan is coupled to a rear pan such that oscillation of the rear pan drives oscillation of the return pan.

4. The combine harvester of claim 1, wherein in the second orientation, the return pan is coupled to the grain pan such that oscillation of the grain pan drives oscillation of the return pan.

5. The combine harvester of claim 1, wherein the return system comprises at least one reversible endless conveyor belt.

6. The combine harvester of claim 5, further comprising at least one sloping wall configured to direct the crop material from the threshing system to the at least one reversible endless conveyor belt.

7. The combine harvester of claim 1, wherein the return system comprises at least one reversible auger.

8. The combine harvester of claim 7, further comprising at least one sloping wall configured to direct the crop material from the threshing system to the at least one reversible auger.

9. The combine harvester of claim 1, wherein the threshing system comprises:
at least one threshing rotor configured to thresh the crop material and separate straw therefrom; and
at least one separator grate below the at least one threshing rotor.

10. The combine harvester of claim 1, wherein the at least one oscillating sieve comprises:
a chaffer; and
a lower sieve below the chaffer.

11. A method of operating a combine harvester having a reversible return system configured to receive crop material from a threshing system and deliver the crop material to a chaffer, the method comprising:
cutting a first crop in a first agricultural field;

threshing the first crop in the threshing system;

transferring the threshed first crop to the reversible return system;

translating the threshed first crop with the return system forward relative to a direction of travel of the combine harvester to the grain pan;

stratifying and transferring the threshed first crop rearward on the grain pan to a chaffer;

changing an operating mode of the reversible return system;

cutting a second crop in a second agricultural field;

threshing the second crop in the threshing system;

transferring the threshed second crop to the reversible return system;

translating the threshed second crop with the return system rearward relative to the direction of travel of the combine harvester; and transferring the threshed second crop to the chaffer.

12. The method of claim 11, wherein harvesting the second crop comprises harvesting corn.

13. The method of claim 11, wherein translating the threshed second crop rearward relative to the direction of travel of the combine harvester with the return system comprises transferring the threshed second crop to a rear of the grain pan.

14. The method of claim 11, wherein a mass flow rate of the second crop to the chaffer is higher than a mass flow rate of the first crop to the chaffer.

* * * * *